United States Patent

Kawano

[11] Patent Number: 5,239,413
[45] Date of Patent: Aug. 24, 1993

[54] OBJECTIVE LENS SYSTEM FOR MICROSCOPES

[75] Inventor: Yoshihiro Kawano, Tokyo, Japan

[73] Assignee: Olympus Optical Co., Ltd., Tokyo, Japan

[21] Appl. No.: 629,558

[22] Filed: Dec. 18, 1990

[30] Foreign Application Priority Data

Dec. 19, 1989 [JP] Japan .................. 1-327376

[51] Int. Cl.$^5$ ............................... G02B 3/00
[52] U.S. Cl. ................... 359/653; 359/652
[58] Field of Search ............ 359/652, 653, 654

[56] References Cited

U.S. PATENT DOCUMENTS

| 4,776,679 | 10/1988 | Kitagishi et al. | 359/654 |
| 4,842,386 | 6/1989 | Kitagishi et al. | 359/654 |
| 4,848,882 | 7/1989 | Suzuki et al. | 359/652 |
| 4,880,298 | 11/1989 | Takada | 359/654 |
| 4,930,880 | 6/1990 | Miyauchi | 359/653 |
| 5,059,005 | 10/1991 | Kawano | 359/654 |

FOREIGN PATENT DOCUMENTS

| 61-113017 | 5/1986 | Japan . |
| 61-176905 | 8/1986 | Japan . |
| 62-31816 | 2/1987 | Japan . |
| 62-31817 | 2/1987 | Japan . |
| 62-34117 | 2/1987 | Japan . |
| 62-50808 | 3/1987 | Japan . |
| 63-170247 | 7/1988 | Japan . |

Primary Examiner—Bruce Y. Arnold
Assistant Examiner—Hung Xuan Dang
Attorney, Agent, or Firm—Cushman, Darby & Cushman

[57] ABSTRACT

A high performance objective lens system for microscopes comprising a plurality but a very small number of lens elements at least one of which is designed as an axial GRIN lens element.

27 Claims, 6 Drawing Sheets

OBJECTIVE LENS SYSTEM FOR MICROSCOPES

BACKGROUND OF THE INVENTION

1. a) Field of the Invention

The present invention relates to an objective lens system for microscopes, and more specifically to an objective lens system for microscopes which is composed of a small number of lens elements and has favorable performance.

2. b) Description of the Prior Art

It is generally difficult to favorably correct astigmatism and curvature of field in an objective lens system with a small number of lens elements. Further, when it is necessary to favorably correct also chromatic aberration in the objective lens system for microscopes, refractive indices and dispersing powers of glass materials of the lens elements must be taken into consideration, thereby making the correction of the aberrations more difficult.

When an attempt is made to design an objective lens system for microscopes which satisfies various demands for working distance, magnification, etc. while solving the problems described above, it is necessary to compose the objective lens system of interest of a very large number of lens elements.

In order to solve the problems described above and design objective lens systems for microscopes having favorably corrected aberrations, graded refractive lenses are used. As conventional examples of objective lens systems for microscopes which adopt graded refractive index lenses, there are known the lens systems disclosed by Japanese Patents Kokai Publication No. Sho 62-31816, No. Sho 62-31817 and No Sho 62-34117.

All of these conventional objective lens systems for microscopes use radial type graded refractive index lenses which have refractive index distributions in the radial direction (radial GRIN lenses).

Further, known as lens systems using axial type graded refractive index lenses which have refractive index distributions in the direction along the optical axis are the lens systems proposed by Japanese Patents Kokai Publication No. Sho 61-176905, No. Sho 61-113017 and No. Sho 62-50808. However, these lens systems are not objective lens systems for microscopes, but photographic lens systems or pickup lens systems for optical disks. Lens systems to be used for different purposes of application have different design specifications and adopt GRIN lenses which are different in their outside diameters, thickness, refractive index gradients (absolute values of the refractive index distribution coefficients of the GRIN lenses) and so on. Most of the axial GRIN lenses used in photographic lens systems for cameras, for example, have larger outside diameters and are thicker than those adopted for objective lens systems for microscopes. Further, the refractive index distribution gradients of the GRIN lenses adopted for objective lens systems for microscopes have larger values than those of the photographic lens systems for cameras.

SUMMARY OF THE INVENTION

A primary object of the present invention is to provide an objective lens system for microscopes which has axial aberrations, offaxial aberrations and chromatic aberration favorably corrected with a small number of lens elements including at least one axial type graded refractive index lens element having refractive index varying in the direction along the optical axis.

The objective lens system for microscopes according to the present invention is composed of a plurality of lens elements, at least one of which is designed as a graded refractive index lens element having refractive index varying in the direction along the optical axis.

The axial GRIN lens element used in the objective lens system for microscope according to the present invention has a refractive index distribution expressed by the following formula:

$$n(x) = N_0 + N_1 x + N_2 x^2 + N_3 x^3 + \ldots$$

wherein the reference symbol $N_0$ represents the refractive index of the GRIN lens element as measured on the vertex thereof on the speciman side, the reference symbol x denotes the distance as measured from said vertex to a lens portion of interest on the optical axis, and the reference symbols $N_1$, $N_2$, $N_3$, ... designate the refractive index distribution coefficients of the first order, the second order, the third order, ... respectively.

Generally speaking, an objective lens system which is composed of a small number of homogeneous lens elements cannot sufficiently correct spherical aberration due to the small number of the lens elements and has a Petzval's sum which has a large positive value due to a positive focal length of the objective lens system as a whole. Further, it is very difficult to correct chromatic aberration in the objective lens system for microscopes.

The present invention has succeeded, by using at least one axial GRIN lens element, in favorably correcting aberrations in the objective lens system for microscopes with lens elements in a number smaller than that of the homogenous lens elements used to compose the general objective lens system for microscopes.

In the objective lens system for microscopes according to the present invention, spherical aberration and the other aberrations can be corrected more favorably by designing, as the axial GRIN lens element, a lens element, out of the lens elements composing the objective lens system, which has at least one surface satisfying the following condition (1):

$$|R|/D \leq 50 \tag{1}$$

wherein the reference symbol R represents the absolute value of the radius of curvature on said surface and the reference symbol D designates the thickness of said lens element as measured at the center thereof.

If the condition (1) is not satisfied, the GRIN lens element will have nearly planar surfaces, whereby the refractive index of the surface which is in contact with air on the optical axis will be scarcely different from that of the surface which is in contact with air at the marginal portion and the aberrations produced due to the curvature on the GRIN lens element will hardly be correctable by the refractive index distribution formed in the vicinity of the lens surface.

Further, aberrations in the objective lens system for microscopes according to the present invention are corrected by designing the axial GRIN lens element so as to have a refractive index difference in satisfying the following condition (2):

$$\Delta n \leq 0.005 \tag{2}$$

wherein the reference symbol Δn represents the difference between the maximum refractive index and the minimum refractive index of the axial GRIN lens element.

If the condition (2) is not satisfied, the aberration correcting capability of the refractive index distribution of the GRIN lens element will be lowered.

The objective lens system for microscopes according to the present invention comprises a plurality of lens elements and have aberrations favorably corrected by designing, as the axial GRIN lens element, at least one lens element, out of the lens elements composing the lens system, on which height of the marginal ray is largely different between the object side surface and the image side surface thereof.

It is generally said that a refractive power cannot be produced only by a medium of an axial GRIN lens element which has refractive index distribution in the direction along the optical axis. In the objective lens system for microscopes according to the present invention, however, aberrations are corrected by designing a lens element on which height of the marginal ray is largely different between the side of incidence and the side of emergence as an axial GRIN lens element so as to produce an angular magnification due to the medium thereof. That is to say, offaxial chromatic aberration is corrected in the objective lens system according to the present invention by designing a lens element satisfying the following condition (3) as the axial GRIN lens element:

$$M_{min}/M_{max} < 0.97 \tag{3}$$

wherein the reference symbols $M_{min}$ and $M_{max}$ represent the height of the axial marginal ray whichever is higher on the object side or the image side of the lens element and the height of the axial marginal ray whichever is lower on the object side or the image side of the lens element. The axial marginal ray means the ray which passes the outermost portion of the aperture when the axial rays passing through the lens system are traced.

If the condition (3) is not satisfied, the axial marginal ray passing through the above-mentioned GRIN lens element is nearly parallel with the optical axis, whereby nearly no refractive power is produced by the medium of the axial GRIN lens element and aberration cannot be corrected with the axial GRIN lens element.

Between a photographic lens system and an objective lens system for microscopes, the offaxial aberrations are corrected in different ways as described below. In the photographic lens system, an image is transmitted from an object point through the photographic lens system to an image point. Therefore, the photographic lens system is designed so as to zero the Petzval's sum thereof. In case of the objective lens system for microscopes, an image is transmitted in a sequence of an object point the objective lens system→an image point→an eyepiece lens another image point. For this reason, the Petzval's sum of the objective lens system for microscopes must be corrected in such a manner that the Petzval's sum of the objective lens system and that of the eyepiece lens system to be used therewith will be cancelled with each other. Petzval's sum is corrected in different ways between the photographic lens system and the objective lens system for microscopes as described above.

When it is desired to correct the Petzval's sum of the objective lens system for microscopes according to the present invention, the correcting function can be enhanced by satisfying the condition (3).

It is possible to correct the aberrations more favorably by using an axial GRIN lens element in addition to the axial GRIN lens element described above.

Further, in order to correct aberrations favorably, it is desirable that each of the GRIN lens elements satisfies the following condition (4):

$$10 > |N_1 \cdot D| < 1 \times 10^{-6} \tag{4}$$

wherein the reference symbol $N_1$ represents the refractive index distribution coefficient of the first order of the axial GRIN lens element and the reference symbol D designates the thickness of the axial GRIN lens element.

If the upper limit of the condition (4) is exceeded, it will be impossible to manufacture the axial GRIN lens element with any of the glass materials which are available at present. If the lower limit of the condition (4) is exceeded, the axial GRIN lens element will have nearly no refractive index distribution and be nearly incapable of correcting aberrations.

From the viewpoint of correction of aberrations in the objective lens system for microscopes according to the present invention, it is desirable to design each of the axial GRIN lens element so as to satisfy the following condition (5):

$$|f_G|/H < 15 \tag{5}$$

wherein the reference symbol $|f_G|$ represents the absolute value of the focal length of the axial GRIN lens element and the reference symbol H designates the height of ray on the axial GRIN lens element.

If the condition (5) is not satisfied, the aberration correcting capability of the axial GRIN lens element will be lowered.

It is practically difficult to manufacture a thick axial GRIN lens element. The axial GRIN lens element used in the objective lens system for microscopes according to the present invention has a refractive index distribution only in a portion thereof so that it can be thick.

The objective lens system for microscopes according to the present invention comprises a plurality of lens elements at least one of which is designed as the axial GRIN lens element as described above. One of the characteristics of the objective lens system for microscopes according to the present invention lies in that the refractive index distribution is formed in the vicinity of the object side surface or the image side surface thereof on which the axial marginal ray is higher.

In order to design an objective lens system for microscopes so as to satisfy specifications for working distance, numerical aperture, magnification, etc., and correct the offaxial aberrations such as Petzval's sum and curvature of field therein with a plurality of lens components, it is necessary to impart different roles to the lens units for composing the objective lens system.

Let us divide the objective lens system for microscopes into a front lens unit and a rear lens unit for describing the roles of the lens units respectively.

The front lens unit has a role mainly for correcting spherical aberration, whereas the rear lens unit has a role mainly for correcting the offaxial aberrations such as Petzval's sum as well as chromatic aberration. When the rolls of both the lens units are determined as described above for designing the objective lens system for microscopes, the height of the axial marginal ray is different between the surfaces of each lens element composing the objective lens system. Especially the front lens unit has a role to diverge an incident light bundle so as to have a sectional size close to the diameter of the pupil while correcting the spherical aberration. Therefore, the height of the axial marginal ray on the surface of incidence (the image side surface) of each of the lens elements arranged in the front lens unit is different from that on the surface of emergence (the image side surface) of the lens element. Further, radius of curvature must be small on the lens elements which have the role to correct Petzval's sum. Also on each of these lens elements, the height of the axial marginal ray on the surface of incidence is different from that of the axial marginal ray on the surface of emergence so far as the axial marginal ray is not parallel with the normal to the lens surfaces.

In case of the photographic lens system for cameras for which an object point is located farther, height of the axial marginal ray is not different so much between the surface of incidence and the surface of emergence of each lens element.

When one of the lens elements on which the height of the axial marginal ray is different between the surface of incidence and the surface of emergence thereof is to be designed as an axial GRIN lens element in the objective lens system for microscopes, it is general to design the axial GRIN lens element so as to have higher refractive index on the side of the surface on which the axial marginal ray is higher for correcting spherical aberration and the other aberrations with this surface. Especially when a refractive index distribution is to be formed in the vicinity only of one surface of a lens element, it is possible to correct the aberrations by forming the refractive index distribution in the vicinity of the surface which is to have higher refractive index of medium.

If a refractive index distribution is formed in the vicinity of the surface on which the axial marginal ray is lower, the aberration correcting capability will be lowered.

The spherical aberration and the other aberrations can be corrected easily when the absolute value of the angle $\theta$ formed between the axial marginal ray before being refracted by the surface having the refractive index distribution of the axial GRIN lens element and the axial marginal ray refracted by said surface is selected so as to satisfy the following condition (6):

$$|\theta| > 2° \qquad (6)$$

If the condition (6) is not satisfied, the axial marginal ray will scarcely be refracted by the above-mentioned surface. Further, since the rays having all numerical aperture are scarcely refracted by this surface, the refractive index distribution formed in the vicinity of the surface will not vary the angles of refraction of the rays, thereby making it impossible to correct the aberrations with the axial GRIN lens element.

Further, it is desirable that the axial GRIN lens element has a refractive index gradient $\Delta n$ satisfying the following condition (7) which is the same as the above-mentioned condition (2):

$$\Delta n \geq 0.005 \qquad (7)$$

If the condition (7) is not satisfied, it will be almost impossible to correct the aberrations by the refractive power of medium of the axial GRIN lens element.

Even in a case where it is practically impossible to form a refractive index distribution in the vicinity of the surface of a axial GRIN lens element, it is possible to divide the axial GRIN lens element into a homogeneous portion (a homogeneous lens element) and an unhomogeneous lens portion (a graded refractive index lens element), manufacture the homogeneous lens element and the graded refractive index lens element separately, and cement these lens elements to each other so as to form a lens element which is equivalent to the axial GRIN lens element in which the refractive index distribution is formed in the vicinity of the surface thereof. The aberrations can be corrected favorably by forming a refractive index distribution in the vicinity of the surface whichever has a smaller radius of curvature.

There are known the conventional imaging lens systems which use axial GRIN lens elements for correcting the axial aberrations, offaxial aberrations and chromatic aberration. In each of these conventional examples, however, the axial GRIN lens can hardly be manufactured in practice since it has $v_{1d}$ of negative value which is expressed by the following formula:

$$v_{1d} = N_{1d}/(N_{1F} - N_{1C})$$

wherein the reference symbols $N_{1d}$, $N_{1F}$ and $N_{1C}$ represent the refractive index distribution coefficients for the d-line, F-line and C-line respectively.

The axial GRIN lens element used in the objective lens system for microscopes according to the present invention is designed so that it can be made of the glass materials currently available as described below.

When a numerical value representing a nature of a compound or a mixture is expressed as a total sum of values representing the nature of the components thereof, it is said that the compound or the mixture has an additive property.

Figure 13:
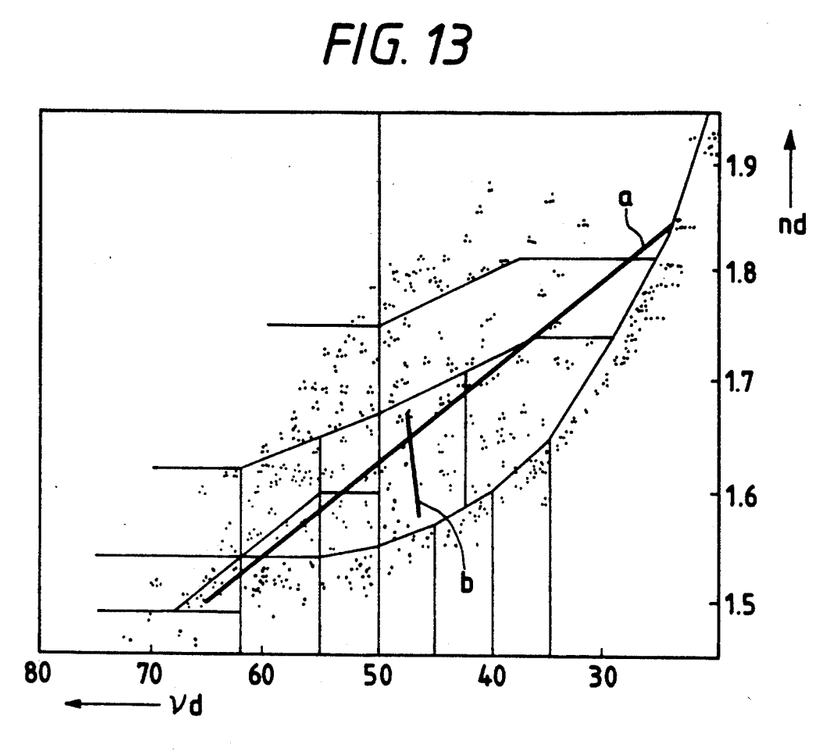
FIG. 13 and FIG. 14 show graphs descriptive of selection of glass materials for the GRIN lens elements.

On the other hand, examinations of optical properties inherent in the elements composing glass materials indicate a fact that the elements having high refractive indices are distributed at the region of small Abbe's numbers and the elements having low refractive indices are distributed at the region of large Abbe's numbers as indicated by the line a on the $n_d$-$v_d$ graph illustrated in FIG. 13. Accordingly, an axial GRIN lens element which has a large difference in refractive index always has a small Abbe's number despite the type of element selected for forming a density gradient in manufacturing the axial GRIN lens element.

As disclosed by Japanese Patent Kokai Publication No. Sho 63-170247, it is possible, by ion exchange between a pair of elements adequately selected, to manufacture a glass material having Abbe's number not varying so much within the range indicated by the line b in FIG. 13 wherein refractive indices are not so high.

This fact is expressed by using the distribution coefficient of the first order $v_{1d}$ as follows:

$$0 < v_{1d} \qquad (8)$$

Figure 14:
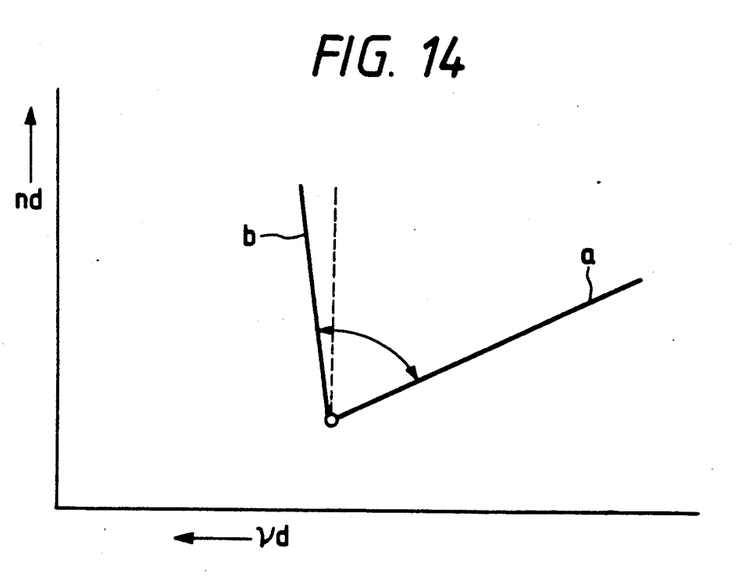

This condition (8) defines a distribution range of axial GRIN lens elements between an axial GRIN lens element whose Abbe's number is reduced as a refractive index of a glass material becomes higher as indicated by the line a in FIG. 14 and another axial GRIN lens element whose Abbe's number is slightly enlarged as a refractive index of a glass material becomes higher as indicated by the line b in FIG. 14.

Further, in order that the axial GRIN lens element can easily be made of one of the glass materials currently available, it is desirable to select $v_{1d}$ within the range defined by the following condition (9):

$$v_{1d} \leq 100 \tag{9}$$

If the upper limit of the condition (9) is exceeded, it will be difficult to manufacture the axial GRIN lens element with any of the glass materials currently available.

The objective lens system for microscopes according to the present invention comprises a plurality of lens components including at least one axial GRIN lens element. In this objective lens system for microscopes, aberrations can be corrected more favorably by using at least one cemented doublet consisting of a homogeneous lens element whose central portion is thicker than the marginal portion thereof and another homogeneous lens element whose central portion is thinner than the marginal portion thereof.

The axial GRIN lens element has a variation of refractive index of medium which has the same function as that of a cemented doublet and is capable of correcting chromatic aberration. In the objective lens system for microscopes in which the longitudinal chromatic aberrations and the lateral chromatic aberrations must be corrected under various restrictions, however, these aberrations can hardly be corrected with the axial GRIN lens element only.

In the objective lens system for microscopes according to the present invention, it is desirable not only to use the above-mentioned cemented doublet but also to design this cemented doublet so as to satisfy the following condition (10):

$$v_{0p} > v_{0n} \tag{10}$$

wherein the reference symbol $v_{0p}$ represents the Abbe's number of the homogeneous lens element whose central portion is thicker than the marginal portion thereof and the reference symbol $v_{0n}$ designates the Abbe's number of the homogeneous lens element whose central portion is thinner than the marginal portion thereof.

If the condition (10) is not satisfied, the cemented doublet will have a lowered function for correcting chromatic aberration and can hardly correct the chromatic aberration.

Further, in order to enhance the achromatic effect or correct the chromatic aberration and the other aberrations in the objective lens system for microscopes according to the present invention, it is preferable to arrange the cemented doublet in the rear lens unit and design either of the lens elements of the cemented doublet as an axial GRIN lens element. In this case also, it is desirable to design the cemented doublet so as to satisfy the condition (10). In this case, the reference symbol $v_{0p}$ represents the value of $v_0$ of an axial GRIN lens element whose central portion is thicker than the marginal portion thereof or the reference symbol $v_{0n}$ designates the value of $v_0$ of an axial lens element whose central portion is thinner than the marginal portion thereof. In addition, $v_0$ is given by the following formula:

$$v_0 = (N_{0d} - 1)/(N_{0F} - N_{0C})$$

Furthermore, in order to correct the chromatic aberration sufficiently favorably, it is desirable to select, for both the lens elements of the cemented doublet, Abbe's numbers satisfying the following condition (11):

$$v_{0p} - v_{0n} > 15 \tag{11}$$

If the condition (11) is not satisfied, the achromatic effect will be lowered, thereby making it impossible to sufficiently correct the chromatic aberration in the objective lens system for microscopes according to the present invention.

Moreover, aberrations can be corrected more favorably in the objective lens system for microscopes according to the present invention by using at least one axial GRIN lens element and at least one radial GRIN lens element (a lens element having refractive index varying in the direction perpendicular to the optical axis).

Typical graded refractive index lenses are classified into the radial GRIN lens and the axial GRIN lens. In practical manufacturing, the radial GRIN lens can be thick but cannot have a large outside diameter. In contrast, the axial GRIN lens can have a large outside diameter but cannot be thick.

The lens elements which are used for composing an objective lens system for microscopes have smaller outside diameters and are thinner than the lens elements composing a photographic lens system for cameras. When these problems on manufacturing of the axial GRIN lens and the radial GRIN lens are taken into consideration, it is possible to solve the problems so far encountered in manufacturing objective lens systems for microscopes and favorably correct aberrations in the objective lens systems by using axial GRIN lens elements as the lens elements which are to be thin but have large outside diameters determined by the axial rays and the offaxial rays in the objective lens system for microscopes, and by employing radial GRIN lens elements as the lens elements which are to have small outside diameters but be thick.

As understood from the foregoing description, it is desirable, when an axial GRIN lens element and a radial GRIN lens element are to be used in the objective lens system for microscopes according to the present invention, to design these GRIN lens element so as to satisfy the following relationship:

$$D_R \geq D_A$$

wherein the reference symbols $D_R$ and $D_A$ represent thickness of the radial GRIN lens element and that of the axial GRIN lens element respectively.

If this relationship is not satisfied, it will be practically difficult to manufacture the GRIN lens elements.

DETAILED DESCRIPTION OF THE PREFERRED EMBODIMENTS

Now, the present invention will be described more detailedly below with reference to the embodiments shown in the accompanying drawings and given in the form of the following numerical data:

Embodiment 1

| | | |
|---|---|---|
| $f = 29.152$, | NA 0.1, | PS = 0.015 |
| $H = 10.5$, | WD = 19.9614, | $d_A = 4.5$ |
| $r_1 = -4.3602$ | | |
| $d_1 = 3.4472$ | $n_1$ (GRIN lens) | |
| $r_2 = -6.1848$ | | |
| $d_2 = 8.4882$ | | |
| $r_3 = 22.2648$ | | |
| $d_3 = 1.4996$ | $n_2 = 1.79219$ | $\nu_2 = 25.43$ |
| $r_4 = 11.9901$ | | |
| $d_4 = 7.3764$ | $n_3 = 1.48749$ | $\nu_3 = 70.15$ |
| $r_5 = -23.1816$ | | |

GRIN lens

| wave length (nm) | $N_0$ | $N_1$ |
|---|---|---|
| 587.56 | 1.59799 | $0.64233 \times 10^{-2}$ |
| 656.28 | 1.59304 | $0.63669 \times 10^{-2}$ |
| 486.13 | 1.60999 | $0.65615 \times 10^{-2}$ |

$\nu_0 = 35.29$, $\nu_1 = 33$ $|R|/D = 1.26$ (side of incidence),
1.79 (side of emergence)
$M_{min}/M_{max} = 0.71$, $\Delta n = 0.02214$
$|N_1 \cdot D| = 0.00221$, $|f_G|/D = 39.1$
$\theta = 8.03$ (side of incidence), 8.43 (side of emergence)

Embodiment 2

| | | |
|---|---|---|
| $f = 30.293$, | NA 0.11, | PS = 0.797 |
| $H = 10.5$, | WD = 31.8034, | $d_A = 10.4$ |
| $d_B = 5$ | | |
| $r_1 = 24.0352$ | | |
| $d_1 = 10.2525$ | $n_1$ (GRIN lens 1) | |
| $r_2 = 15.491$ | | |
| $d_2 = 5.9441$ | $N_2$ (GRIN lens 2) | |
| $r_3 = -25.0922$ | | |

GRIN lens 1 (radial type)

| wave length (nm) | $N_0$ | $N_1$ | $N_2$ |
|---|---|---|---|
| 587.56 | 1.80416 | $0.98437 \times 10^{-3}$ | $0.53184 \times 10^{-5}$ |
| 656.28 | 1.79602 | $0.97153 \times 10^{-3}$ | $0.52387 \times 10^{-5}$ |
| 486.13 | 1.82875 | $0.10143 \times 10^{-2}$ | $0.55046 \times 10^{-5}$ |

$\nu_0 = 24.56951$, $\nu_1 = 23$, $\nu_2 = 20$

GRIN lens 2

| wave length (nm) | $N_0$ | $N_1$ | $N_2$ |
|---|---|---|---|
| 587.56 | 1.6 | $0.55 \times 10^{-1}$ | $0.20201 \times 10^{-1}$ |
| 656.28 | 1.596 | $0.54625 \times 10^{-1}$ | $0.20063 \times 10^{-1}$ |
| 486.13 | 1.60933 | $0.55875 \times 10^{-1}$ | $0.20522 \times 10^{-1}$ |

$\nu_0 = 45$, $\nu_1 = 44$, $\nu_2 = 44$ $|R|/D = 2.61$ (side of incidence),
4.22 (side of emergence)
$M_{min}/M_{max} = 0.92$, $\Delta n = 0.27026$
$|N_1 \cdot D| = 0.33$, $|f_G|/D = 2.44$
$\theta = 3.785$ (side of incidence), 2.582 (side of emergence)
$\nu_{0p} - \nu_{0n} = 20.43$, $D_R = 10.25$, $D_A = 5.94$

Embodiment 3

| | | |
|---|---|---|
| $f = 16.341$, | NA 0.25, | PS = 0.034 |
| $H = 10.5$, | WD = 3.6511, | $d_A = 15.8$ |
| $d_B = 2.2$ | | |
| $r_1 = -15.8924$ | | |
| $d_1 = 2$ | $n_1 = 1.83481$ | $\nu_1 = 42.72$ |
| $r_2 = -4.3897$ | | |
| $d_2 = 2.5$ | | |

-continued

| | | |
|---|---|---|
| $r_3 = -3.3504$ | | |
| $d_3 = 11.1022$ | $n_2$ (GRIN lens 1) | |
| $r_4 = 26.0038$ | | |
| $d_4 = 3.5$ | $n_3$ (Grin lens 2) | |
| $r_5 = -10.8443$ | | |

GRIN lens 1

| wave length (nm) | $N_0$ | $N_1$ |
|---|---|---|
| 587.56 | 1.64322 | $-0.38745 \times 10^{-2}$ |
| 656.28 | 1.6355 | $-0.37582 \times 10^{-2}$ |
| 486.13 | 1.66123 | $-0.41457 \times 10^{-2}$ |

| wave length (nm) | $N_2$ | $N_3$ |
|---|---|---|
| 587.56 | $-0.18639 \times 10^{-3}$ | $0.16994 \times 10^{-4}$ |
| 656.28 | $-0.1836 \times 10^{-3}$ | $0.16763 \times 10^{-4}$ |
| 486.13 | $-0.19292 \times 10^{-3}$ | $0.17535 \times 10^{-4}$ |

$\nu_0 = 25$, $\nu_1 = 10$, $\nu_2 = 22$

GRIN lens 2

| wave length (nm) | $N_0$ | $N_1$ |
|---|---|---|
| 587.56 | 1.67 | $0.76794 \times 10^{-1}$ |
| 656.28 | 1.6665 | $0.76026 \times 10^{-1}$ |
| 486.13 | 1.67782 | $0.78586 \times 10^{-1}$ |

| wave length (nm) | $N_2$ | $N_3$ |
|---|---|---|
| 587.56 | $-0.75 \times 10^{-2}$ | $0.52063 \times 10^{-3}$ |
| 656.28 | $-0.7425 \times 10^{-2}$ | $0.51542 \times 10^{-3}$ |
| 486.13 | $-0.7675 \times 10^{-2}$ | $0.53278 \times 10^{-3}$ |

$\nu_0 = 60$, $\nu_1 = 30$, $\nu_2 = 30$ $|R|/D = 0.3$ (side of incidence),
2.34 (side of emergence)
$M_{min}/M_{max} = 0.36$, $\Delta n = 0.04273$
$|N_1 \cdot D| = 0.043$, $|f_G|/D = 0.37$
$\theta = 8.68$ (side of incidence), 0.82 (side of emergence)
$\nu_{0p} - \nu_{0n} = 35$ (GRIN lens 1)
$|R|/D = 7.43$ (side of incidence),
3.1 (side of emergence)
$M_{min}/M_{max} = 0.9$, $\Delta n = 0.1992$
$|N_1 \cdot D| = 0.27$, $|f_G|/D = 2.81$
$\theta = 0.82$ (side of incidence), 9.64 (side of emergence)
(GRIN lens 2)

Embodiment 4

| | | |
|---|---|---|
| $f = 8.653$, | NA 0.4, | PS = 0.682 |
| $H = 10.5$, | WD = 2.9998 | |
| $d_A = 1.5$, | $d_B = 3.3$, | $d_C = 2.2$ |
| $r_1 = -10.7789$ | | |
| $d_1 = 1.622$ | $n_1$ (GRIN lens 1) | |
| $r_2 = -5.9459$ | | |
| $d_2 = 6.5135$ | | |
| $r_3 = 1061.5$ | | |
| $d_3 = 4.1731$ | $n_2$ (GRIN lens 2) | |
| $r_4 = -9.9353$ | | |
| $d_4 = 0.15$ | | |
| $r_5 = 25.1792$ | | |
| $d_5 = 1.1$ | $n_3$ (GRIN lens 3) | |
| $r_6 = 6.2955$ | | |
| $d_6 = 8$ | $n_4$ (GRIN lens 4) | |
| $r_7 = 35.0171$ | | |

GRIN lens 1

| wave length (nm) | $N_0$ | $N_1$ | $N_2$ |
|---|---|---|---|
| 587.56 | 1.81646 | $0.33746 \times 10^{-1}$ | $0.47162 \times 10^{-2}$ |
| 656.28 | 1.81125 | $0.33521 \times 10^{-1}$ | $0.46879 \times 10^{-2}$ |
| 486.13 | 1.82862 | $0.34271 \times 10^{-1}$ | $0.47822 \times 10^{-2}$ |

$\nu_0 = 47$, $\nu_1 = 45$, $\nu_2 = 50$

GRIN lens 2

| wave length (nm) | $N_0$ | $N_1$ | $N_2$ |
|---|---|---|---|
| 587.56 | 1.51742 | $0.44269 \times 10^{-1}$ | $0.66018 \times 10^{-3}$ |
| 656.28 | 1.51455 | $0.44004 \times 10^{-1}$ | $0.65688 \times 10^{-3}$ |
| 486.13 | 1.52408 | $0.44889 \times 10^{-1}$ | $0.66788 \times 10^{-3}$ |

$\nu_0 = 54.29787$, $\nu_1 = 50$, $\nu_2 = 60$

GRIN lens 3

| wave length (nm) | $N_0$ | $N_1$ | $N_2$ |
|---|---|---|---|
| 587.56 | 1.77755 | $-0.1779 \times 10^{-1}$ | $0.11815 \times 10^{-2}$ |
| 656.28 | 1.76925 | $-0.17352 \times 10^{-1}$ | $0.11663 \times 10^{-2}$ |
| 486.13 | 1.79802 | $-0.18813 \times 10^{-1}$ | $0.1217 \times 10^{-2}$ |

-continued $v_0 = 27.02492$, $v_1 = 12.175$, $v_2 = 23.293$
GRIN lens 4 (radial type)

| wave length (nm) | $N_0$ | $N_1$ | $N_2$ |
|---|---|---|---|
| 587.56 | 1.62901 | $-0.41941 \times 10^{-4}$ | $0.19577 \times 10^{-5}$ |
| 656.28 | 1.62628 | $-0.41503 \times 10^{-4}$ | $0.19493 \times 10^{-5}$ |
| 486.13 | 1.63642 | $-0.42962 \times 10^{-4}$ | $0.19773 \times 10^{-5}$ |

$v_0 = 62$, $v_1 = 28.738$, $v_2 = 70$
$|R|/D = 6.65$ (side of incidence),
3.67 (side of emergence)
$M_{min}/M_{max} = 0.76$, $\Delta n = 0.06715$
$|N_1 \cdot D| = 0.055$, $|f_G|/D = 7.45$
$\theta = 7.5$ (side of incidence), 2 (side of emergence)
(GRIN lens 1)
$v_{0p} - v_{0n} = 35$, $D_R = 8$, $D_A = 1.1$
$|R|/D = 254.37$ (side of incidence),
2.38 (side of emergence)
$M_{min}/M_{max} = 0.87$, $\Delta n = 0.19624$
$|N_1 \cdot D| = 0.185$, $|f_G|/D = 3.32$
$\theta = 5.04$ (side of incidence), 6.97 (side of emergence)
(GRIN lens 2)
$|R|/D = 22.89$ (side of incidence),
0.79 (side of emergence)
$M_{min}/M_{max} = 0.95$, $\Delta n = 0.01814$
$|N_1 \cdot D| = 0.02$, $|f_G|/D = 10.4$
$\theta = 2.87$ (side of incidence), 2.35 (side of emergence)
(GRIN lens 3)

Embodiment 5

| $f = 4.585$, | NA 0.65 | PS = 0.797 |
|---|---|---|
| $H = 10.5$, | WD = 0.701 | |
| $d_A = 2$, | $d_B = 2.5$, | $d_C = 1.3$ |

$r_1 = -5.6077$
$d_1 = 2.1155$  $n_1$ (GRIN lens 1)
$r_2 = -3.2465$
$d_2 = 0.6349$
$r_3 = 46.0349$
$d_3 = 3.3153$  $n_2$ (GRIN lens 2)
$r_4 = -4.9148$
$d_4 = 1.0641$
$r_5 = 29.5751$
$d_5 = 0.6284$  $n_3$ (GRIN lens 3)
$r_6 = 5.0849$
$d_6 = 3.8881$  $n_4 = 1.53235$  $v_4 = 42.59$
$r_7 = -8.5119$
GRIN lens 1

| wave length (nm) | $N_0$ | $N_1$ | $N_2$ |
|---|---|---|---|
| 587.56 | 1.755 | $0.58978 \times 10^{-2}$ | $0.15906 \times 10^{-2}$ |
| 656.28 | 1.75063 | $0.58632 \times 10^{-2}$ | $0.15812 \times 10^{-2}$ |
| 486.13 | 1.76506 | $0.59788 \times 10^{-2}$ | $0.16124 \times 10^{-2}$ |

$v_0 = 52.33$, $v_1 = 51$, $v_2 = 51$
GRIN lens 2

| wave length (nm) | $N_0$ | $N_1$ | $N_2$ |
|---|---|---|---|
| 587.56 | 1.497 | $0.21414 \times 10^{-1}$ | $0.63039 \times 10^{-3}$ |
| 656.28 | 1.49514 | $0.21322 \times 10^{-1}$ | $0.62769 \times 10^{-3}$ |
| 486.13 | 1.50123 | $0.21628 \times 10^{-1}$ | $0.6367 \times 10^{-3}$ |

$v_0 = 81.61$, $v_1 = 70$, $v_2 = 70$
GRIN lens 3

| wave length (nm) | $N_0$ | $N_1$ | $N_2$ |
|---|---|---|---|
| 587.56 | 1.84666 | $-0.17518 \times 10^{-2}$ | $0.68764 \times 10^{-3}$ |
| 656.28 | 1.83649 | $-0.17289 \times 10^{-2}$ | $0.67867 \times 10^{-3}$ |
| 486.13 | 1.8721 | $-0.18051 \times 10^{-2}$ | $0.70857 \times 10^{-3}$ |

$v_0 = 23.78$, $v_1 = 23$, $v_2 = 23$
$|R|/D = 2.65$ (side of incidence),
1.53 (side of emergence)
$M_{min}/M_{max} = 0.44$, $\Delta n = 0.0196$
$|N_1 \cdot D| = 0.012$, $|f_G|/D = 3.35$
$\theta = 15.39$ (side of incidence), 2.01 (side of emergence)
$v_{0p} - v_{0n} = 18.81$ (GRIN lens 1)
$|R|/D = 13.89$ (side of incidence),
1.48 (side of emergence)

-continued $M_{min}/M_{max} = 0.75$, $\Delta n = 0.0779$
$|N_1 \cdot D| = 0.071$, $|f_G|/D = 2.41$
$\theta = 8.78$ (side of incidence), 11.15 (side of emergence)
(GRIN lens 2)
$|R|/D = 47.06$ (side of incidence),
8.09 (side of emergence)
$M_{min}/M_{max} = 0.995$, $\Delta n = 0.00083$
$|N_1 \cdot D| = 0.0011$, $|f_G|/D = 11.69$
$\theta = 2.58$ (side of incidence), 6.03 (side of emergence)
(GRIN lens 3)

Embodiment 6

| $f = 8.846$, | NA 0.4 | PS = 0.8 |
|---|---|---|
| $H = 10.5$, | WD = 3 | |
| $d_A = 1.7$, | $d_B = 1.9$, | $d_C = 2.1$ |

$r_1 = -7.7446$
$d_1 = 1.8627$  $n_1$ (GRIN lens 1)
$r_2 = -4.846$
$d_2 = 5.5267$
$r_3 = 263.8922$
$d_3 = 2.699$  $n_2$ (GRIN lens 2)
$r_4 = -7.3625$
$d_4 = 0.15$
$r_5 = -23.3557$
$d_5 = 1.3$  $n_3$ (GRIN lens 3)
$r_6 = 10.9563$
$d_6 = 2.5$  $n_4 = 1.60955$  $v_4 = 42.39$
$r_7 = -12.2884$
GRIN lens 1
(From the object side surface to 0.6 mm therefrom:
$n_d = 1.80849$, $v_d = 45.05$)

| wave length (nm) | $N_0$ | $N_1$ |
|---|---|---|
| 587.56 | 1.80849 | $0.76557 \times 10^{-1}$ |
| 656.28 | 1.8031 | $0.76182 \times 10^{-1}$ |
| 486.13 | 1.82105 | $0.7743 \times 10^{-1}$ |

$v_0 = 45.05$, $v_1 = 61.36$
GRIN lens 2

| wave length (nm) | $N_0$ | $N_1$ | $N_2$ |
|---|---|---|---|
| 587.56 | 1.48837 | $-0.20891 \times 10^{-2}$ | $-0.24983 \times 10^{-3}$ |
| 656.28 | 1.48564 | $-0.20656 \times 10^{-2}$ | $-0.33654 \times 10^{-3}$ |
| 486.13 | 1.49476 | $-0.21438 \times 10^{-2}$ | $-0.47528 \times 10^{-3}$ |

$v_0 = 53.53$, $v_1 = 26.72$, $v_2 = -0.8645$
GRIN lens 3

| wave length (nm) | $N_0$ | $N_1$ | $N_2$ |
|---|---|---|---|
| 587.56 | 1.77607 | $0.16849 \times 10^{-1}$ | $0.15799 \times 10^{-1}$ |
| 656.28 | 1.7674 | $0.16157 \times 10^{-1}$ | $0.15851 \times 10^{-1}$ |
| 486.13 | 1.79611 | $0.18463 \times 10^{-1}$ | $0.15679 \times 10^{-1}$ |

$v_0 = 27.04$, $v_1 = 7.31$, $v_2 = -92.03$
$|R|/D = 4.16$ (side of incidence),
2.6 (side of emergence)
$M_{min}/M_{max} = 0.722$, $\Delta n = 0.08518$
$|N_1 \cdot D| = 0.143$, $|f_G|/D = 5.391$
$\theta = 6.24$ (side of incidence), 5.04 (side of emergence)
(GRIN lens 1)
$|R|/D = 97.8$ (side of incidence),
2.7 (side of emergence)
$M_{min}/M_{max} = 0.922$, $\Delta n = 0.00746$
$|N_1 \cdot D| = 0.00564$, $|f_G|/D = 5.534$
$\theta = 4.31$ (side of incidence), 6.04 (side of emergence)
(GRIN lens 2)
$|R|/D = 17.97$ (side of incidence),
8.43 (side of emergence)
$M_{min}/M_{max} = 0.974$, $\Delta n = 0.0486$
$|N_1 \cdot D| = 0.0219$, $|f_G|/D = 6.974$
$\theta = 0.57$ (side of incidence), 3.28 (cemented surface)
4.65 (side of emergence)
$v_{0p} - v_{0n} = 25.35$ (GRIN lens 3)

wherein the reference symbol PS represents the Petzval's sum of the objective lens system for microscopes, the reference symbol H designates the image height, the reference symbol WD denotes the working distance of the objective lens system for microscopes, the reference symbols $r_1, r_2, \ldots$ represent radii of curvature on the surface of the respective lens elements, the reference symbols, $d_1, d_2, \ldots$ designate thicknesses of the respective lens elements and the airspaces reserved therebetween, the reference symbol $n_1, n_2, \ldots$ denote the refractive indices of the respective lens elements, the reference symbols $\nu_1, \nu_2, \ldots$ represent Abbe's numbers of the respective lens elements, and the reference symbols $d_A$, $d_B$ and $d_C$ designate the thickness of the GRIN lens elements 1, 2 and 3 respectively as measured at the marginal portions thereof wherein refractive index distributions are formed.

Figure 1:
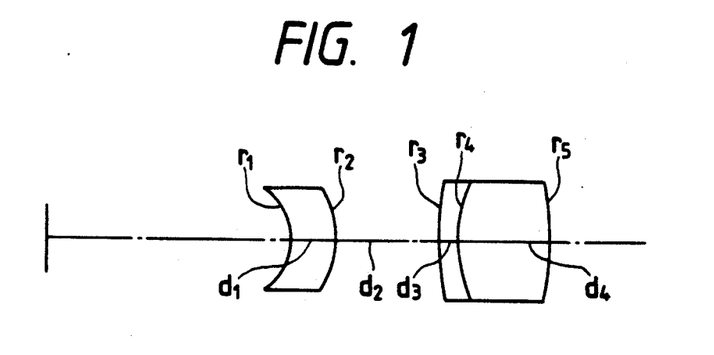
FIG. 1 through FIG. 6 show sectional views illustrating compositions of Embodiments 1 through 6 of the objective lens system for microscopes according to the present invention.

The embodiment 1 has the composition illustrated in FIG. 1 wherein the lens component arranged at the most object side location is designed as an axial GRIN lens component.

Since the front lens unit comprising the first lens component generally has a remarkable influence on aberrations in an objective lens system for microscopes, a GRIN lens element is arranged in the front lens unit for correcting the aberrations produced by the lens surfaces.

The Embodiment 1 is designed as an objective lens system for microscopes having a low magnification of 4×. Since the objective lens system for microscopes has the low magnification below 5×, the lens system as a whole has a long focal length and the lens components thereof also have relatively long focal lengths. The first lens component used in the Embodiment 1 has a relatively long focal length of $|f_1| \geqq 10$ mm. Accordingly, the lens elements have relatively large radii of curvature on the surfaces thereof but the aberrations produced by the lens surface cannot be corrected completely with homogeneous lens elements only.

In the Embodiment 1, the first lens component is designed as the axial GRIN lens component so that aberrations can be corrected favorably even at the marginal portion of visual field with a small number of lens elements.

Figure 2:
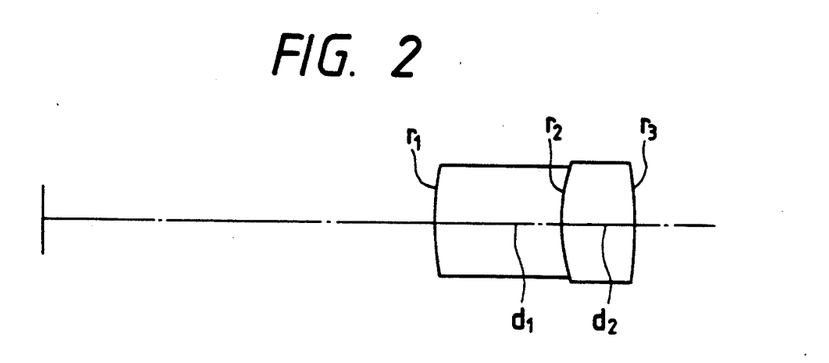

The Embodiment 2 has the composition illustrated in FIG. 2 wherein aberrations are favorably corrected by using a cemented doublet consisting of an axial GRIN lens element and a radial GRIN lens element.

The Embodiment 2 is an objective lens system for microscopes also having a low magnification of 4×, and designed so as to have a long working distance and a compact size by adopting the above-described cemented doublet consisting of the axial GRIN lens element and the radial GRIN lens element. Speaking more concretely, the first lens element must be thick and is designed as the axial GRIN lens element which can be manufactured thick, whereas the second lens element must have a large diameter and is designed as the radial GRIN lens element which can be manufactured so as to have a large outside diameter.

Figure 3:
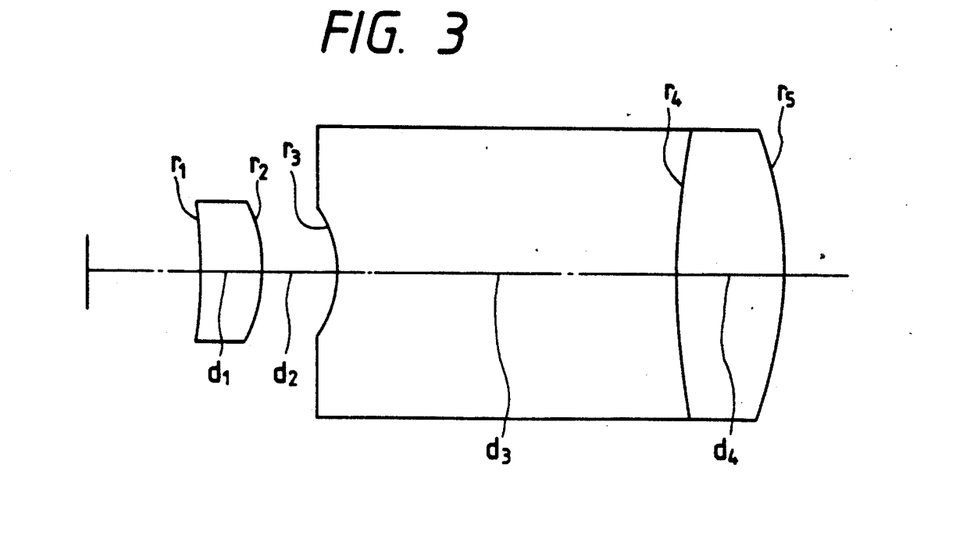

The Embodiment 3 have the composition shown in FIG. 3 wherein the objective lens system for microscopes adopts a cemented doublet consisting of two axial GRIN lens elements.

The Embodiment 3 is designed as an objective lens system for microscopes having a magnification of 10×. In an objective lens system for microscopes having a magnification of 10× or lower, a light bundle can be converged by designing the first lens component thereof as a convex lens component and Petzval's sum can be corrected by selecting a small radius of curvature on the object side concave surface of the second lens component thereof.

In the Embodiment 3, the second lens component is composed of the two axial GRIN lens elements so that the longitudinal chromatic aberration is corrected by utilizing the variation of refractive index of medium and the lateral chromatic aberration is corrected by designing the second lens component as the cemented doublet.

Figure 4:
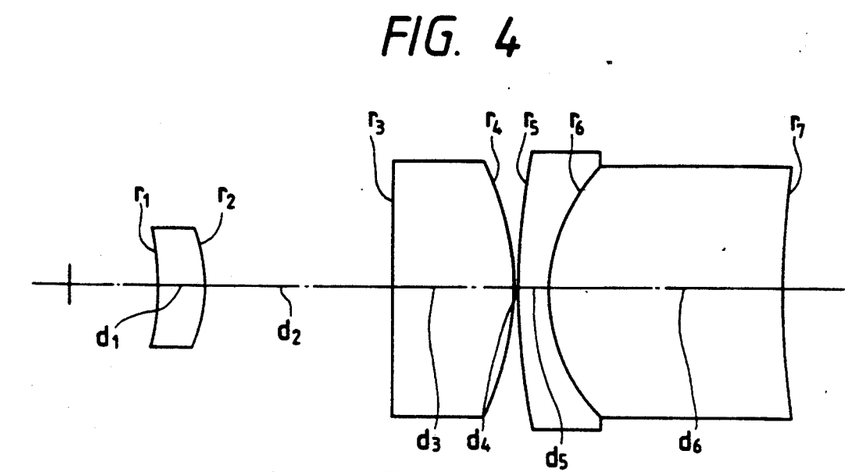

The Embodiment 4 is an objective lens system for microscopes having the composition illustrated in FIG. 4 wherein aberrations are corrected favorably by designing a lens element which must have a large outside diameter as an axial GRIN lens element and another lens element which must be thick at the central portion thereof as a radial GRIN lens element.

Figure 5:
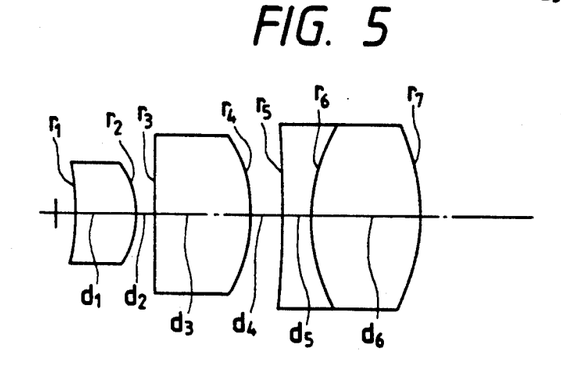

The Embodiment 5 is an objective lens system for microscopes having the composition shown in FIG. 5 and a magnification of 40×. In this embodiment, aberrations are corrected by using a cemented doublet which is composed by cementing an axial GRIN lens element and a homogeneous lens element to each other.

Figure 6:
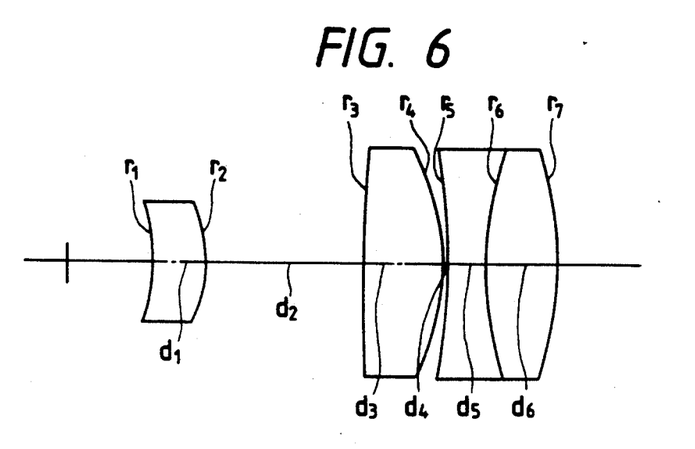
Figure 7:
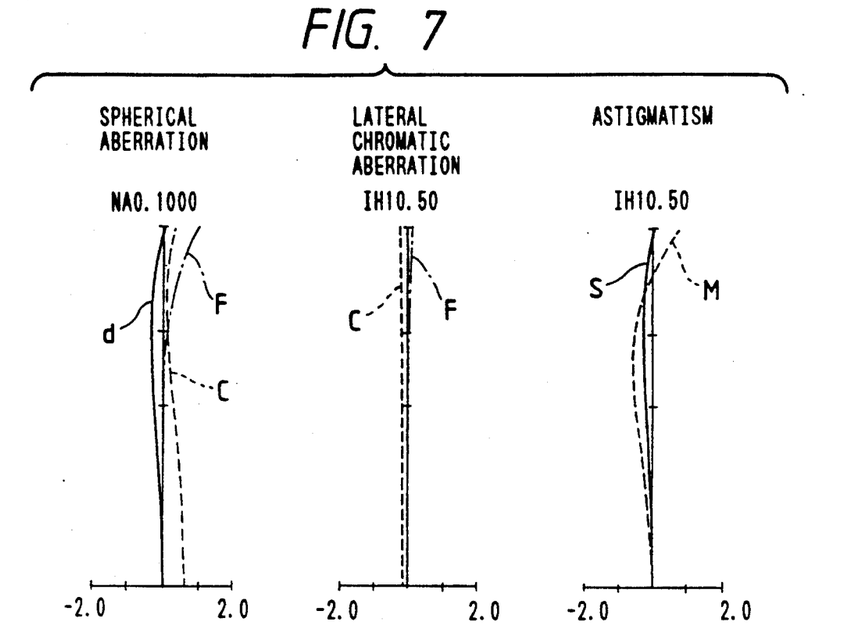
FIG. 7 through FIG. 12 show graphs illustrating aberration characteristics of the Embodiments 1 through 6 of the present invention.
Figure 8:
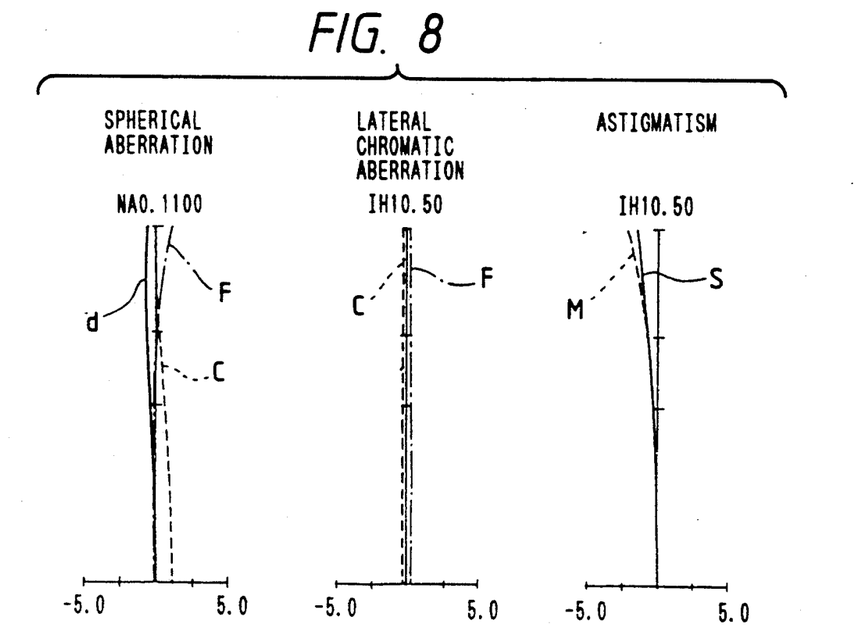
Figure 9:
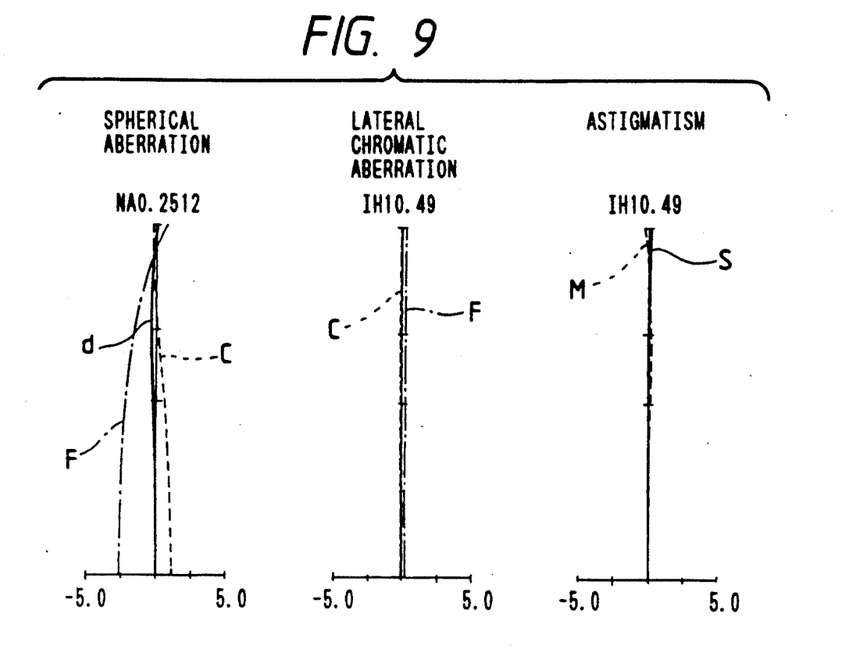
Figure 10:
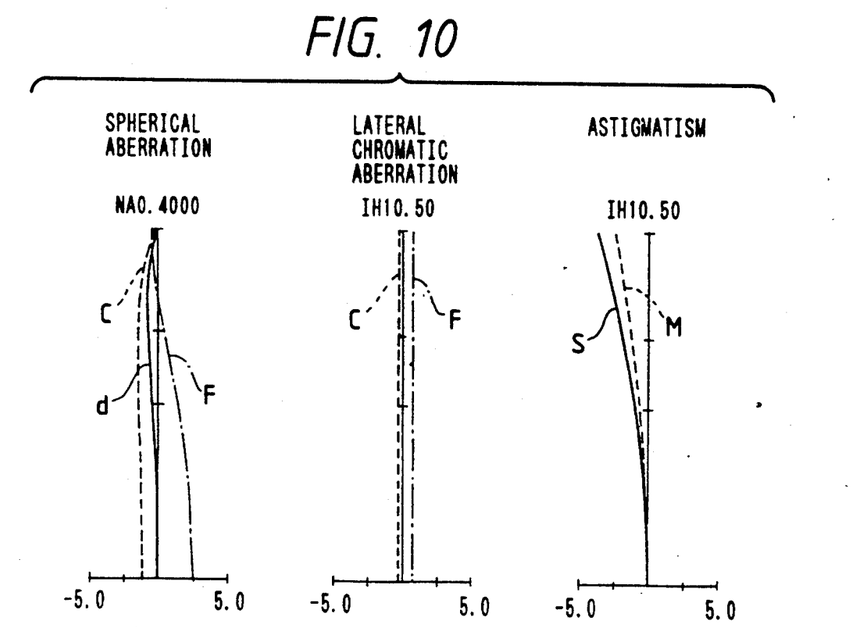
Figure 11:
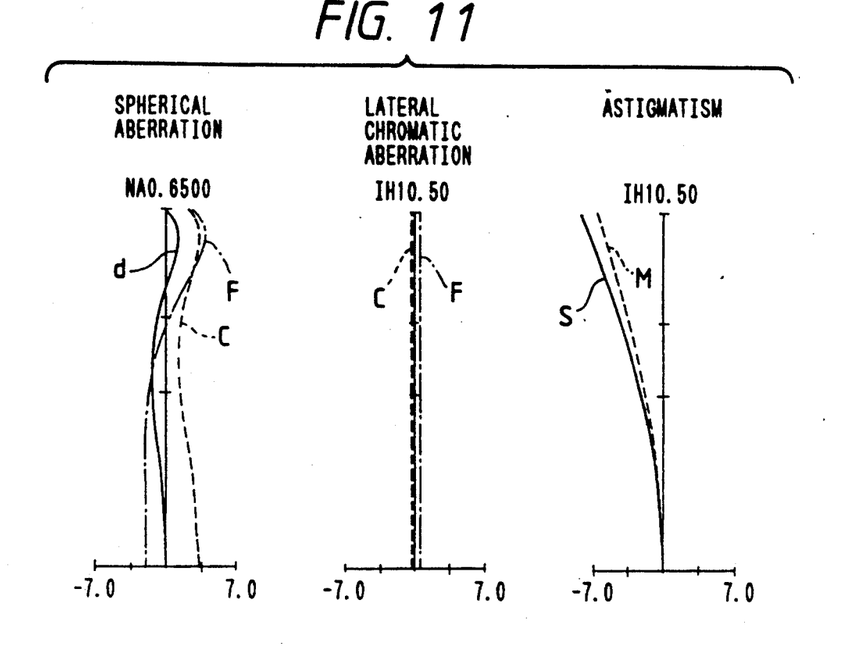
Figure 12:
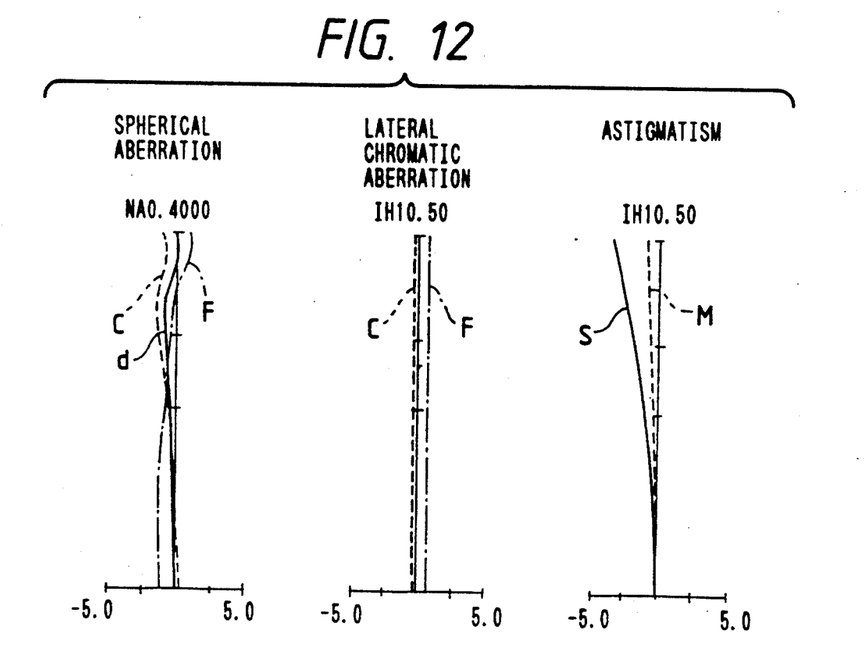

The Embodiment 6 has the composition shown in FIG. 6 wherein aberrations are corrected by forming a refractive index distribution in at least one single-element lens component in the vicinity of either surface thereof whichever has a smaller radius of curvature. Speaking concretely, the refractive index distribution is formed in the vicinity of the image side surface of the first lens component for favorably correcting aberrations in the objective lens system for microscopes. The Embodiment 6 is designed as an objective lens system for microscopes having a magnification of 20×.

For dividing the objective lens system for microscopes according to the present invention into the front lens unit and the rear lens unit, the airspace d2 is to be taken as a boundary in the Embodiments 1, 2, 4 and 6, whereas the airspace d4 is to be considered as a boundary in the Embodiment 5. However, when the airspace d4 is taken as a boundary for dividing the objective lens system into the front lens unit and the rear lens unit, the description set forth in this patent specification is applicable relatively well to these embodiments.

In the Embodiments described above, heights of the marginal ray on the lens surfaces are as listed below:

Embodiment 1

| r | Hight of axial marginal ray |
|---|---|
| 1 | 1.97 |
| 2 | 2.77 |
| 3 | 3.65 |
| 4 | 3.61 |
| 5 | 3.86 |

Embodiment 2

| r | Hight of axial marginal ray |
|---|---|
| 1 | 3.56 |
| 2 | 3.72 |
| 3 | 4.06 |

Embodiment 3

| r | Hight of axial marginal ray |
|---|---|
| 1 | 0.97 |

-continued

| r | Hight of axial marginal ray |
|---|---|
| 2 | 1.28 |
| 3 | 1.41 |
| 4 | 3.92 |
| 5 | 4.35 |

Embodiment 4

| r | Hight of axial marginal ray |
|---|---|
| 1 | 1.32 |
| 2 | 1.73 |
| 3 | 3.47 |
| 4 | 3.99 |
| 5 | 3.94 |
| 6 | 3.75 |
| 7 | 3.40 |

Embodiment 5

| r | Hight of axial marginal ray |
|---|---|
| 1 | 0.65 |
| 2 | 1.46 |
| 3 | 1.84 |
| 4 | 2.45 |
| 5 | 2.51 |
| 6 | 2.58 |
| 7 | 2.97 |

Embodiment 6

| r | Hight of axial marginal ray |
|---|---|
| 1 | 1.31 |
| 2 | 1.81 |
| 3 | 3.09 |
| 4 | 3.36 |
| 5 | 3.33 |
| 6 | 3.42 |
| 7 | 3.56 |

Further, the radial GRIN lens elements used in the Embodiments 2 to 4 has the refractive index distributions expressed by the following formula:

$$n(r) = N_0 + N_1 r^2 + N_2 r^4 + \ldots$$

wherein the reference symbol $N_0$ represents the refractive index as measured on the optical axis, the reference symbol r designates the distance as measured from the optical axis to a lens portion of interest, and the reference symbols $N_1$, $N_2$, ... denote the refractive index distribution coefficients.

As is understood from the foregoing description, the objective lens system for microscopes according to the present invention is a lens system wherein the axial aberrations, offaxial aberrations and chromatic aberration are corrected very favorably by using at least one axial GRIN lens element.

I claim:

1. An objective lens system for microscopes comprising:
   a plurality of lens element including an axial type graded refractive index lens element which has a refractive index distribution N(x) in the direction along an optical axis of said lens system;
   wherein the refractive index distribution of said graded refractive index lens element is expressed by the formula shown below $$n(x) = N_0 + N_1 x + N_2 x^2 + N_3 x^3 + \ldots$$

and said graded refractive index lens element satisfies the following condition:

$$31.8034 > WD > 0.0701$$

wherein the reference symbol $N_0$ represent a refractive index of said graded refractive index lens element as measured on a vertex thereof on the specimen side, the reference symbol x designates a distance as measured from said vertex to a lens portion of interest located on the optical axis, the reference symbol $N_1$, $N_2$, $N_3$, ... denote refractive lens distribution coefficients of the first order, the second order, the third order, ... respectively, and the reference symbol WD represents a working distance of said objective lens system.

2. An objective lens system for microscopes according to claim 1 satisfying the following condition:

$$0 < V_{1d}, \quad V_{1d} = N_{1d}/(N_{1F} - N_{1C})$$

wherein the reference symbols $N_{1d}$, $N_{1F}$ and $N_{1C}$ represent refractive index distribution coefficients of the first order of said graded refractive index lens element for the d-line, F-line and C-line, respectively.

3. An objective lens system for microscopes according to claim 2 wherein said graded refractive index lens element satisfies the following condition:

$$|R|/D \leq 50 \tag{1}$$

wherein the reference symbol R represents the radius of curvature on each of the surfaces of said graded refractive index lens element and the reference symbol D designates the thickness of said graded refractive index lens element.

4. An objective lens system for microscopes according to claim 3 wherein said graded refractive index lens element satisfies the following condition:

$$10 > |N_1 \cdot D| > 1 \times 10^{-6} \tag{4}$$

wherein the reference symbol $N_1$ represents the refractive index distribution coefficient of the first order of said graded refractive index lens element and the reference symbol D designates the thickness of said graded refractive index lens element.

5. An objective lens system for microscopes according to claim 3 wherein said graded refractive index lens element satisfies the following condition:

$$|f_G|/H < 15 \tag{5}$$

wherein the reference symbol $f_G$ represents the focal length of said graded refractive index lens element and the reference symbol H designates the height of ray on said graded refractive index lens element.

6. An objective lens system for microscopes according to claim 2 satisfying the following condition:

$$V_{1d} < 100$$

$$V_{1d} = N_{1d}/(N_{1F} - N_{1C}).$$

7. An objective lens system for microscopes according to claim 1 comprising, in the order form the object side, an axial GRIN lens element having a concave surface on the object side and a biconvex homogeneous lens element.

8. An objective lens system for microscopes comprising:

a plurality of lens elements including an axial type graded refractive index lens element having a refractive index distribution expressed by the following formula in the direction along the optical axis:

$$n(x) = N_0 + N_1 x + N_2 x^2 + N_3 x^3 + \ldots$$

and the graded refractive index lens element satisfying the following conditions:

$$0 < V_{1d}, \quad V_{1d} = N_{1d}/(N_{1F} - N_{1C})$$

and wherein the axial marginal ray has an angle of refraction $\theta$ satisfying the following condition on the surface having the refractive index distribution of said graded refractive index lens element:

$$|\theta| > 2°.$$

9. An objective lens system for microscopes according to claim 8 wherein a difference $\Delta n$ between the highest refractive index and the smallest refractive index in said graded refractive index lens satisfies the following condition:

$$\Delta n \geq 0.005.$$

10. An objective lens system for microscopes comprising:

a plurality of lens elements including an axial type graded refractive index lens element having a refractive index distribution expressed by the following formula in the direction along the optical axis:

$$n(x) = N_0 + N_1 x + N_2 x^2 + N_3 x^3 + \ldots$$

and the graded refractive index lens element satisfying the following conditions:

$$|R|/D \leq 50$$

$$\Delta n \geq 0.005$$

$$0 < V_{1d}, \quad V_{1d} = N_{1d}/(N_{1f} - N_{1C})$$

wherein the reference symbol R represent a radius of curvature on each surface of said graded refractive index lens element, the reference symbol D designates thickness of said graded refractive index lens element, and the reference symbols $N_{1d}$, $N_{1F}$ and $N_{1C}$ represent refractive index distribution coefficients of the first order of said graded refractive index lens element for the d-line, F-line and C-line, respectively, and the reference symbol $\Delta n$ represents the difference between the maximum refractive index and the minimum refractive index lens element in said graded refractive index lens element.

11. An objective lens system for microscopes according to claim 9 or claim 10, wherein said graded refractive index lens element is disposed at a location satisfying the following condition:

$$M_{min}/M_{max} < 0.97$$

wherein the reference symbols $M_{max}$ and $M_{min}$ represent the higher and lower heights, respectively, of the axial marginal ray on the object side and image side surfaces of said graded refractive index lens element.

12. An objective lens system for microscopes according to claim 11, wherein said graded refractive index lens element has a refractive index distribution in the vicinity of one of the surface of incidence and the surface of emergency thereof which has the higher height of the axial marginal ray.

13. An objective lens system for microscopes according to claim 11, wherein refractive index of said graded refractive index lens element is higher in the vicinity of the surface which has the higher height of the axial marginal ray than that in the vicinity of the other surface.

14. An objective lens system for microscopes comprising:

a plurality of lens elements including an axial type graded refractive index lens element having a refractive index distribution expressed by the following formula in the direction along the optical axis:

$$n(x) = N_0 + N_1 x + N_2 x_2 + N_3 x^3 + \ldots$$

and the graded refractive index lens element satisfying the following conditions:

$$0 < V_{1d}, \quad V_{1d} = N_{1d}/(N_{1F} - N_{1C})$$
$$|R|/D \leq 50$$

and wherein said graded refractive index lens element is disposed at a location satisfying the following condition:

$$M_{min}/M_{max} < 0.97$$

wherein the reference symbol R represent a radius of curvature on each surface of said graded refractive index lens element, the reference symbol D designates thickness of said graded refractive index lens element, the reference symbols $N_{1d}$, $N_{1F}$ and $N_{1C}$ represent refractive index distribution coefficients of the first order of said graded refractive index lens element for the d-line, F-line an dC-line, respectively, and the reference symbols Mmax and Mmin represent the higher and lower heights respectively of the axial marginal ray on the object side and image side surfaces of said graded refractive index lens element.

15. An objective lens system for microscopes according to claim 14 wherein said graded refractive index lens element has a refractive index distribution in the vicinity of one of the surface of incidence and the surface of emergence thereof which has the higher height of the axial marginal ray.

16. An objective lens system for microscopes according to claim 14 wherein refractive index of said graded refractive index lens element is higher in the vicinity of the surface thereof which has the higher height of the axial marginal ray than in the vicinity of the other surface.

17. An objective lens system for microscopes comprising:

a plurality of lens elements including an axial type graded refractive index lens element having a refractive index distribution expressed by the following formula in the direction along the optical axis:

$$n(x) = N_0 + N_1 x + N_2 x^2 + N_3 x^3 + \ldots$$

and the graded refractive index lens element satisfying the following condition:

$$0 < V_{1d}, \quad V_{1d} = N_{1d}/(N_{1F} - N_{1C})$$

wherein the reference symbols $N_{1d}$, $N_{1F}$ and $N_{1C}$ represent refractive index distribution coefficients of the first order of said graded refractive index lens element for the d-line, F-line and C-line, respectively, and wherein said graded refractive index lens element is a cemented doublet consisting of a non-homogeneous lens element and a homogeneous lens element.

18. An objective lens system for microscopes comprising:
a plurality of lens elements including an axial type graded refractive index lens element having a refractive index distribution expressed by the following formula in the direction along the optical axis:

$$n(x) = N_0 + N_1 x + N_2 x^2 + N_3 x^3 + \ldots$$

and the graded refractive index lens element satisfying the following condition:

$$0 < V_{1d}, \quad V_{1d} = N_{1d}/(N_{1f} - N_{1c})$$

wherein the reference symbols $N_{1d}$, $N_{1F}$ and $N_{1C}$ represent refractive index distribution coefficients of the first order of said graded refractive index lens element for the d-line, F-line and C-line, respectively, and wherein said objective lens system comprises a cemented doublet consisting of a lens element thicker at a marginal portion thereof than an axial portion thereof and another lens element thicker at an axial portion thereof than a marginal portion thereof.

19. An objective lens system for microscopes comprising:
a plurality of lens elements including an axial type graded refractive index lens element having a refractive index distribution expressed by the following formula in the direction along the optical axis:

$$n(x) = N_0 + N_1 x + N_2 x^2 + N_3 x^3 + \ldots$$

and the graded refractive index lens element satisfying the following condition:

$$0 < V_{1d}, \quad V_{1d} = N_{1d}/(N_{1f} - N_{1c})$$

wherein the reference symbols $N_{1d}$, $N_{1F}$ and $N_{1C}$ represent refractive index distribution coefficients of the first order of said graded refractive index lens element for the d-line, F-line and C-line, respectively, and wherein said objective lens system comprises a front lens group and a rear lens group, and said rear lens group comprises a cemented doublet consisting of a GRIN lens element and another lens element.

20. An objective lens system for microscopes according to claim 18 or 19 wherein said cemented doublet satisfies the following condition:

$$\nu_{0p} > \nu_{0n}$$

wherein the reference symbols $\nu_{0p}$ and $\nu_{0n}$ represent the Abbe's numbers of said lens elements thicker at the central portion thereof than the marginal portion thereof and said lens element thinner at the central portion thereof than the marginal portion thereof respectively, said Abbe's numbers being given by the following formula when said lens elements are graded refractive index lens elements:

$$\nu_0 = (N_{0d} - 1)/(N_{0F} - N_{0C}).$$

21. An objective lens system for microscopes according to claim 20 wherein said cemented doublet satisfies the following condition:

$$\nu_{0p} - \nu_{0n} > 15.$$

22. An objective lens system for microscopes comprising:
a plurality of lens elements including an axial type graded refractive index lens element having a refractive index distribution expressed by the following formula in the direction along the optical axis:

$$n(x) = N_0 + N_1 x + N_2 x^2 + N_3 x^3 + \ldots$$

and the graded refractive index lens element satisfying the following condition:

$$0 < V_{1d}, \quad V_{1d} = N_{1d}/(N_{1F} - N_{1C})$$

wherein the reference symbols $N_{1d}$, $N_{1F}$ and $N_{1C}$ represent refractive index distribution coefficients of the first order of said graded refractive index lens elements for the d-line, F-line and C-line, respectively, and wherein said objective lens system comprises a radial-type GRIN lens element in addition to said axial-type GRIN lens element.

23. An objective lens system for microscopes according to claim 22 satisfying the following condition:

$$D_R \geq D_A$$

wherein the reference symbols $D_R$ and $D_A$ represent thickness of the radial GRIN lens element and that of the axial GRIN lens element respectively.

24. An objective lens system for microscopes according to claim 23 comprises a biconvex cemented doublet consisting of an axial GRIN lens element and a radial GRIN lens element.

25. An objective lens system for microscopes comprising:
a plurality of lens elements including an axial type graded refractive index lens element having a refractive index distribution expressed by the following formula in the direction along the optical axis:

$$n(x) = N_0 + N_1 x + N_2 x^2 + N_3 x^3 + \ldots$$

and the graded refractive index lens element satisfying the following condition:

$$0 < V_{1d}, \quad V_{1d} = N_{1d}/(N_{1F} - N_{1C})$$

wherein the reference symbols $N_{1d}$, $N_{1F}$ and $N_{1C}$ represent refractive index distribution coefficients of the first order or said graded refractive index lens element for the d-line, F-line and C-line, respectively, and wherein said objective lens system comprises, in order from the object side, an lens element having a concave surface on the object side, and a cemented doublet consisting of two axial GRIN lens elements and having a concave surface on the object side.

26. An objective lens system for microscopes comprising:

a plurality of lens elements including an axial type graded refractive index lens element having a refractive index distribution expressed by the following formula in the direction along the optical axial:

$n(x) = N_0 + N_1 x + N_2 x^2 + N_3 x^3 + \ldots$ and the graded refractive index lens element satisfying the following condition:

$0 < V_{1d}, \quad V_{1d} = N_1 d / (N_1 F - N_1 C)$ wherein the reference symbols $N_{1d}$, $N_{1F}$ and $N_{1C}$ represent refractive index distribution coefficients of the first order of said graded refractive index lens element for the d-line, F-line and C-line, respectively, and wherein said objective lens system comprises a lens element having a concave surface on the object side and disposed on the most object side therein, and a cemented doublet disposed on the most image side therein.

27. An objective lens system for microscopes comprising:

a plurality of lens elements including an axial type graded refractive index lens element having a refractive index distribution expressed by the following formula in the direction along the optical axis:

$n(x) = N_0 + N_1 x + N_2 x^2 + N_3 x^3 + \ldots$ and the graded refractive index lens element satisfying the following condition:

$0 < V_{1d}, \quad V_{1d} = N_1 d / (N_1 F - N_1 C)$ wherein the refractive symbols $N_{1d}$, $N_{1F}$ and $N_{1C}$ represent refractive index distribution coefficients of the first order of said graded refractive index lens element for the d-line, F-line and C-line, respectively, and wherein said objective lens system comprises two positive lens elements, and a cemented doublet consisting of said axial graded refractive lens elements and a homogeneous lens element.

* * * * *